Feb. 20, 1962  E. J. HAUSKAMA  3,022,109
REAR VIEW MIRROR ANTI-GLARE SHIELD
Filed June 23, 1960
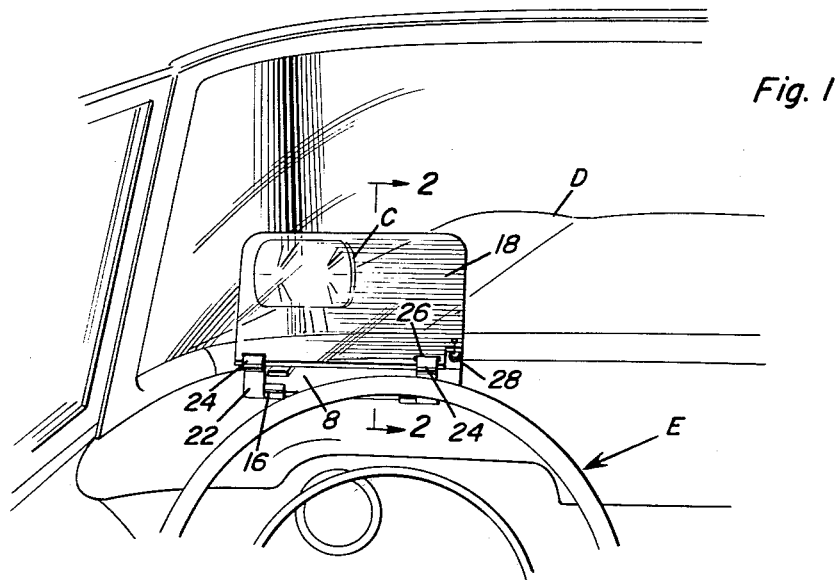
Fig. 1
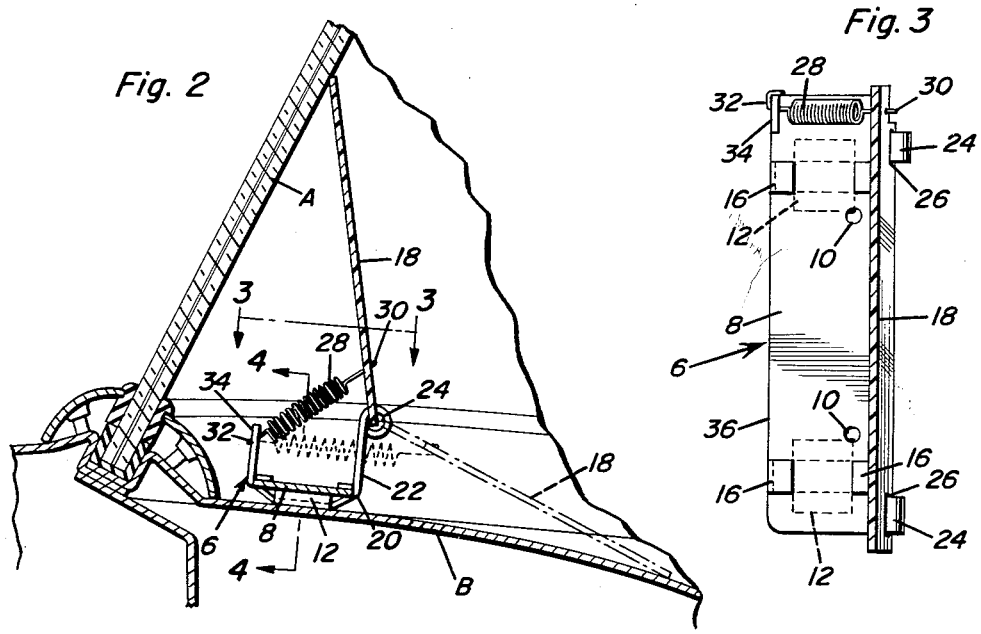
Fig. 2
Fig. 3
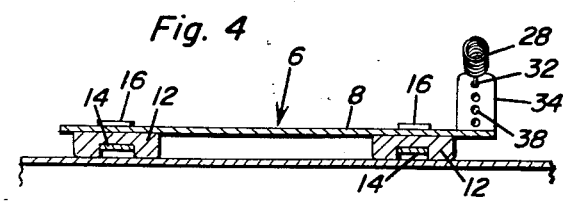
Fig. 4
Elmer J. Hauskama
INVENTOR.
BY United States Patent Office 3,022,109
Patented Feb. 20, 1962

3,022,109
REAR VIEW MIRROR ANTI-GLARE SHIELD
Elmer J. Hauskama, 118 1st St., Highland Park,
Glendive, Mont.
Filed June 23, 1960, Ser. No. 38,168
4 Claims. (Cl. 296—97)

This invention relates to an improved anti-glare shield which, when in use, effectively reduces the likelihood of accidents traceable to a blinding light beam from an outside-type rear view mirror.

Among the many driving hazards, particularly when driving at night, is the ever-present likelihood that the driver may be momentarily blinded by a dazzling light beam reflected from an outside rear view mirror mounted, for instance, on the automobile fender in front of and to the left of the driver. This problem is one which has been long recognized. In fact, many inventors working in this field of endeavor have devised and offered many and varied styles and forms of glare intercepting screens and the like. Generally speaking, light intercepting shields and screens have been hingedly and otherwise bracketed so that whenever the driver of the car notices an oncoming car from the rear speedily gaining on him the anti-glare shield or screen is brought into play.

In carrying out the instant invention and, with a view toward advancing the art, a structurally distinct shield is provided. Briefly, the present invention has to do with a light beam intercepting and glare-reducing panel or screen. This screen is hingedly mounted on a bracket and the bracket is constructed to be mounted on the windshield cowl inwardly of the windshield and in a position conveniently accessible to the driver of the car.

A significant improvement resides in providing a specially constructed attaching bracket. This bracket comprises a plate which may be either screwed in position on the cowl or may be provided with permanent magnets and temporarily positioned and held in place by the magnets. The interceptor panel is hingedly mounted and may be swung rearwardly and downwardly against the cowl and held by spring means in an out-of-the-way position. The same spring means also serves to hold the interceptor panel in an upright light beam modifying position behind and adjacent to the windshield when it is in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view showing a portion of the interior of an automobile or equivalent car or vehicle and also showing the anti-glare shield and how it is constructed and positioned for use.

FIG. 2 is a view on a larger scale taken on the plane of the line 2—2 of FIG. 1.

FIG. 3 is a horizontal section on the line 3—3 of FIG. 2.

FIG. 4 is a section on the vertical line 4—4 of FIG. 2.

In the views of the drawing, particularly FIGS. 1 and 2, the conventional type windshield is denoted by the reference character A, the instrument panel cowl is designated at B. The outside rear view mirror is denoted at C, the same being shown mounted on the fender D to the left and in front of the steering wheel E.

The invention is characterized, as already mentioned, by an adapter and mounting bracket which is generally denoted by the numeral 6. This bracket preferably comprises a substantially rectangular rigid plate 8. In practice (FIG. 3) the plate may be provided with holes 10 to accommodate fastening screws or equivalent fasteners (not shown). Inasmuch as one may not desire to permanently attach the plate to the cowl B alternative means may be utilized. For example, one might adopt and successfully use rubber suction cups (not shown) but, by preference, it has been found desirable and satisfactory to use permanent magnets 12. The magnets here are held in place on the plate by suitable attaching and retaining straps 14 which are saddled in place on the notched portions of the magnets and which have terminal ends 16 bent and clipped over longitudinal edge portions of the plate. Experience has shown that a plate equipped with spaced magnets 12 held in place as illustrated may be satisfactorily used. The light beam intercepting and glare-reducing panel or shield is denoted by the numeral 18 and this may be made of suitable plastic material. Differently colored shields may be suitably used as, for example, the color may be blue, green or amber, blue being preferred. The average size would be eight inches wide and five inches high. The base plate 6 would be of a length corresponding to the length of the panel 18. The rearward longitudinal edge portion 20 of the plate is provided at opposite ends with a pair of upstanding supporting and hinging fingers 22 the upper ends of which are coiled to form attaching and hinging eyes 24. These eyes are cooperable with slots 26 provided in the panel 18 adjacent one edge thereof in the manner shown. Thus, the slotted lower edge portion of the panel is hingedly suspended and the panel may be swung down to the dotted line or out-of-the-way position (as shown in FIG. 2) or swung up toward the interior side of the windshield and thus positioned for use in proper alignment with the rear view mirror and the driver of the car. In practice, a single suitable coil spring 28 has been provided and one end thereof as at 30 is connected to a cut-out corner portion at the lower right-hand end portion of the shield as shown in FIG. 1. The other end 32 of the spring is adjustably attached to a spring anchoring shank 34. This finger or shank, like the fingers 22, is struck up from the plate, preferably from the forward edge portion 36. This shank may be provided with a plurality of holes 38 to facilitate adjustably anchoring the spring-end 32.

It will be evident that with the elevated hinge points provided for the vertically swingable shield 18 the latter is held in both of its positions by the same spring 28. By raising the shield to the usable position shown in full lines in FIG. 2 on the inside of the windshield any objectionable glare that might otherwise be encountered by the driver is intercepted by the blue colored shield and thus the effect of the glaring light is reduced to a safe driving minimum. Manifestly the shield is turned down to an out-of-the-way position for daytime driving so as not to hamper clear vision through the windshield. At night, when no traffic is gaining or appears to be gaining on the driver the shield is down. On the other hand, when oncoming glare difficulties appear to be imminent all that the driver has to do is to catch hold of the adjacent edge of the panel and flip the same up to the glare intercepting position shown in FIGS. 1 and 2.

In practice it will be evident that the base plate may be equipped with strong magnets in order to securely hold the plate in position atop the cowl. Or, if preferred, and the magnets are not desired or suction cups are not thought to be practical, the plate may be suitably shaped and, being provided with screw holes, screws may be utilized to fasten the plate securely in position.

In connection with the foregoing and since the magnets 12 are strapped on by the metal applying and retaining or equivalent straps 14, the magnets may be removed if the screws alone are to be used for the fastening means. Of course, using magnets avoids the necessity of drilling holes in the instrument panel cowl. The shield is positioned in keeping with the requirements of the position of the outside mirror in order to be in the proper line of interception relative to the position of the driver. Also, it will be seen that the bracket 6 is mounted with the spring 28 directed toward the windshield. The spring holds the shield against the windshield when it is up and, in fact, it also holds it down against the cowl when it is not in use. In other words, the tension of the spring is utilized in both ways. The dotted line position of the spring in FIG. 2 shows the pull of the spring below dead-center. In practice, it has been found that the base plate 8, the spring anchoring member or shank 34 and the upstanding shield hinging and supporting fingers 22 may be fashioned from one piece of aluminum. Plastic material could, of course, be substituted for metal.

Briefly summarized, the invention is characterized by a simple plate-type bracket 6 with the plate 8 provided with attaching means, that is, means for securing the plate atop the cowl B. On the rear edge and at opposite ends the elevated fingers 22 with hinge means function to hingedly support the swingable anti-glare panel. The coil spring is attached at one end to an end portion of the panel and at the other end to the adjustable anchor member 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anti-glare attachment for the cowl of an automobile windshield structure comprising a bracket embodying a plate having detachable permanent magnets on the bottom of the plate for mounting the plate in a given position on an automobile cowl, said plate being provided on a rear longitudinal edge with spaced upstanding fingers, provided on a forward longitudinal edge with an upstanding finger providing a spring attaching shank, a coil spring having a forward end detachably and adjustably secured to said shank, said rear fingers being provided at upper ends thereof with hinging eyes, and an intercepting panel having a lower edge portion spanning the space between said rear fingers and hingedly joined with said eyes, the rear end of said spring being connected to a cooperating marginal edge portion of said panel.

2. An anti-glare automobile instrument panel attachment comprising an attaching bracket embodying a plate having means whereby the same may be positioned and mounted for use atop a predetermined portion of the instrument panel, said plate being provided on a rearward longitudinal edge with a pair of longitudinally spaced coplanar upstanding fingers, an anti-glare shield embodying a panel having a slotted lower edge portion spaced above the plane of said plate and hingedly joined to hinging ends atop the upper end portions of said fingers, a coil spring located in front of the panel having a forward end thereof detachably and adjustably mounted on an anchoring finger provided therefor on said plate, the rearward end of said spring being connected to an end of said panel, and permanent magnets situated on the underneath side of the plate and removably strapped on said plate for optional use.

3. An anti-glare attachment for the cowl of an automobile windshield structure comprising a bracket embodying a rigid plate generally rectangular in plan and provided with holes to accommodate optionally usable fastening screws, a pair of permanent magnets longitudinally spaced from each other and disposed transversely across the bottom side of said plate and detachably mounted on the plate by way of attaching and retaining straps embracing the respective magnets and having end portions clipped over edge portions of the plate, said plate being provided on a rear lengthwise edge with longitudinally spaced upstanding fingers, being further provided on a forward lengthwise edge with an upstanding spring attaching and anchoring shank, a coil spring having a forward end detachably secured to said shank, said fingers being provided at upper ends thereof with hinging eyes, and an intercepting panel having a lower edge portion spanning the space between said fingers and hingedly joined with said hinging eyes, the rear end of said spring being connected to a cooperating marginal edge portion of said panel.

4. An anti-glare automobile instrument panel attachment comprising an attaching bracket embodying a plate having a pair of permanent magnets removably strapped on the end portions of the underneath side of said plate whereby the magnets and said plate may be positioned and mounted for use atop a predetermined portion of a windshield cowl, a rearward lengthwise edge of said plate being provided with spaced-apart coplanar upstanding fingers, said fingers being situated at the transverse end portions of said plate, an anti-glare shield embodying a panel having a slotted lower edge portion spaced above the plane of the plate and hingedly mounted atop the upper end portions of said fingers, a spring anchoring shank carried by one end of the plate and rising from the forward longitudinal edge of the plate, and a coil spring having a rearward end attached to a cooperating end portion of said panel and a forward end detachably connected to said shank.

References Cited in the file of this patent

UNITED STATES PATENTS

| | | |
|---|---|---|
| 1,493,289 | Speicher | May 6, 1924 |
| 1,624,741 | Leppke et al. | Apr. 12, 1927 |
| 1,671,180 | Dahl | May 29, 1928 |
| 2,187,027 | Harvey | Jan. 16, 1940 |
| 2,410,171 | Le Lande | Oct. 29, 1946 |
| 2,528,038 | Crise | Oct. 31, 1950 |
| 2,603,530 | Jones | July 15, 1952 |
| 2,813,749 | Wetig | Nov. 19, 1957 |

FOREIGN PATENTS

| | | |
|---|---|---|
| 323,929 | Great Britain | Jan. 16, 1930 |